(12) United States Patent
Parent et al.

(10) Patent No.: US 7,915,196 B2
(45) Date of Patent: Mar. 29, 2011

(54) ATTRITION RESISTANT FLUIDIZABLE REFORMING CATALYST

(75) Inventors: Yves O. Parent, Golden, CO (US); Kim Magrini, Golden, CO (US); Steven M. Landin, Conifer, CO (US); Marcus A. Ritland, Palm Beach Shores, FL (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 11/576,422

(22) PCT Filed: Oct. 7, 2005

(86) PCT No.: PCT/US2005/036588
§ 371 (c)(1),
(2), (4) Date: Feb. 9, 2009

(87) PCT Pub. No.: WO2007/044009
PCT Pub. Date: Apr. 19, 2007

(65) Prior Publication Data
US 2009/0209412 A1      Aug. 20, 2009

(51) Int. Cl.
*B01J 23/00* (2006.01)
*B01J 21/00* (2006.01)
*B01J 20/00* (2006.01)
*B01J 29/00* (2006.01)
*B01J 37/00* (2006.01)

(52) U.S. Cl. ........ 502/335; 502/252; 502/259; 502/261; 502/263; 502/303; 502/306; 502/314; 502/315; 502/316; 502/317; 502/318; 502/320; 502/323; 502/324; 502/327; 502/328; 502/330; 502/331; 502/332; 502/333; 502/334; 502/336; 502/337; 502/338; 502/339; 502/340; 502/341; 502/344; 502/345; 502/346; 502/355; 502/407; 502/415; 502/439; 502/104

(58) Field of Classification Search ................. 502/259, 502/263, 303, 304, 306, 308, 310, 315, 326, 502/327, 328, 332, 334, 335, 337, 339, 340, 502/341, 349, 352, 355, 439, 104, 252, 261, 502/262, 314, 316, 317, 318, 320, 323, 324, 502/330, 331, 333, 336, 338, 344, 345, 346, 502/415
See application file for complete search history.

(56) References Cited

U.S. PATENT DOCUMENTS
23,034 A    2/1859    Lowry
(Continued)

FOREIGN PATENT DOCUMENTS
EP    0 417 629 B1    5/1990

OTHER PUBLICATIONS

International Search Report dated Feb. 16, 2007 and Written Opinion of the International Searching Authority for International Application No. PCT/US2005/36588.

(Continued)

*Primary Examiner* — Cam N Nguyen
(74) *Attorney, Agent, or Firm* — Paul J. White; John C. Stolpa; W. LaNelle Owens

(57) ABSTRACT

A method of preparing a steam reforming catalyst characterized by improved resistance to attrition loss when used for cracking, reforming, water gas shift and gasification reactions on feedstock in a fluidized bed reactor, comprising: fabricating the ceramic support particle, coating a ceramic support by adding an aqueous solution of a precursor salt of a metal selected from the group consisting of Ni, Pt, Pd, Ru, Rh, Cr, Co, Mn, Mg, K, La and Fe and mixtures thereof to the ceramic support and calcining the coated ceramic in air to convert the metal salts to metal oxides.

30 Claims, 1 Drawing Sheet

U.S. PATENT DOCUMENTS

Figure 1:
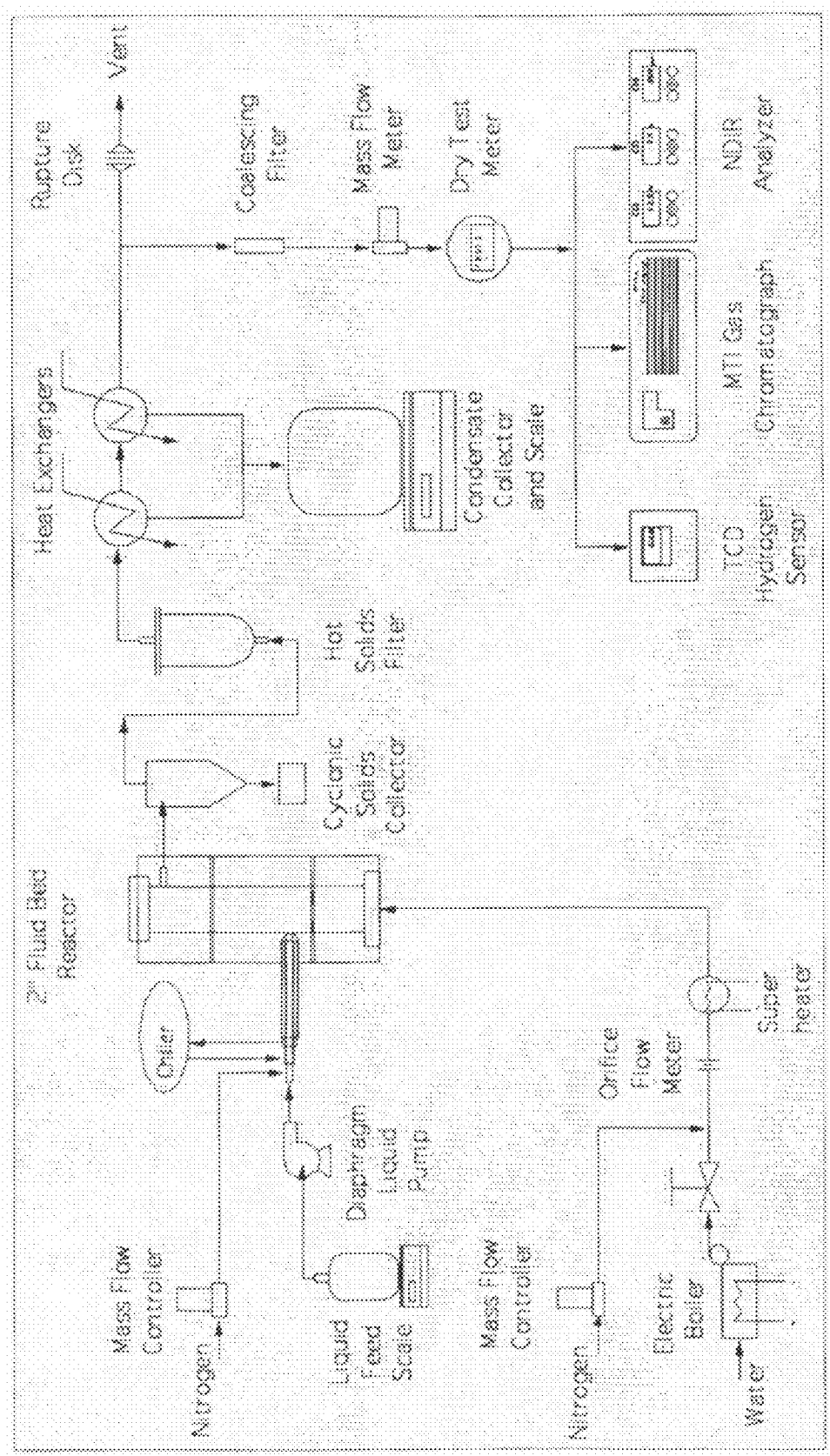

| | | | |
|---|---|---|---|
| 103,893 | A | 6/1870 | Kent |
| 105,170 | A | 7/1870 | Chadderdon |
| 115,800 | A | 6/1871 | Wood |
| 155,037 | A | 9/1874 | McNitt |
| 3,271,325 | A * | 9/1966 | Stone et al. .................... 502/333 |
| 3,334,055 | A * | 8/1967 | Davies et al. .................. 502/243 |
| 3,432,443 | A * | 3/1969 | Hughes et al. ................. 502/243 |
| 4,046,869 | A * | 9/1977 | Dorawala et al. ............. 423/652 |
| 4,207,211 | A * | 6/1980 | Russ et al. ..................... 502/324 |
| 4,233,179 | A | 11/1980 | Russ et al. |
| 4,732,688 | A | 3/1988 | Bryan et al. |
| 4,810,685 | A * | 3/1989 | Twigg et al. .................... 502/60 |
| 4,863,712 | A * | 9/1989 | Twigg et al. .................... 423/651 |
| 4,952,389 | A | 8/1990 | Szymanski et al. |
| 5,268,512 | A * | 12/1993 | Miki et al. ..................... 568/801 |
| 5,476,877 | A | 12/1995 | Clavenna et al. |
| 5,679,614 | A | 10/1997 | Bangala et al. |
| 5,744,419 | A | 4/1998 | Choudhary et al. |
| 5,752,995 | A | 5/1998 | Kang |
| 6,262,132 | B1 | 7/2001 | Singleton et al. |
| 6,509,000 | B1 | 1/2003 | Choudhary et al. |
| 6,693,060 | B2 | 2/2004 | Park et al. |
| 2001/0023034 | A1 | 9/2001 | Verykios |
| 2002/0035036 | A1 | 3/2002 | Figueroa et al. |
| 2002/0131915 | A1 | 9/2002 | Shore et al. |
| 2002/0155037 | A1 | 10/2002 | Otsuka et al. |
| 2002/0177628 | A1 | 11/2002 | Gaffney et al. |
| 2003/0103893 | A1 | 6/2003 | De Lasa et al. |
| 2003/0105170 | A1 | 6/2003 | Jothimurugesan et al. |
| 2003/0115800 | A1 | 6/2003 | Yamada et al. |
| 2003/0149120 | A1 | 8/2003 | Wang et al. |
| 2003/0165424 | A1 | 9/2003 | Ramani et al. |
| 2003/0180215 | A1 | 9/2003 | Niu et al. |
| 2004/0052725 | A1 | 3/2004 | Niu et al. |
| 2004/0265225 | A1 | 12/2004 | Watson et al. |
| 2005/0054738 | A1 | 3/2005 | Fraenkel |
| 2005/0096215 | A1 | 5/2005 | Espinoza et al. |
| 2006/0009352 | A1 * | 1/2006 | Zhao et al. ..................... 502/302 |
| 2006/0009353 | A1 * | 1/2006 | Cai et al. ....................... 502/341 |

OTHER PUBLICATIONS

Sudsakorn, K. et al., Preparation of Attrition-Resistant Spray-Dried Fe Fischer-Tropsch Catalysts Using Precipitated SiO2, Ind. Eng. Chem. Res. 2001, 4778-4784, vol. 40.

Ismagilov, Z. et al., Synthesis of mechanically strong and thermally stable spherical alumina catalyst supports . . . , Catalysis Today, 1995, 269-271, 24, Elsevier Science.

Ismagilov, Z. et al., New technology for production of sperical alumina supports for fluidized bed combustion, Catalysis Today, 1999, 57-71, vol. 47, Elsevier Science BV.

Courson, et al., "Development of Ni catalysts for gas production from biomass gasificiation. Reactivity in steam- and dry-reforming". Catalysis Today, 2000, vol. 63, pp. 427-437.

Courson, et al., "Hydrogen production from biomass gasification on nickel catalysts Tests for dry reforming of methane", Catalysis Today, 2002, vol. 76, pp. 75-86.

French, et al,, "Fluidizable Catalysts for Hydrogen Production from Steam Reforming Biomass Pyrolysis Products", Preprints of Symposia, American Chemical Society, Division of Fuel Chemistry, 2002, vol. 47, No. 2, pp. 759-760.

Rapagna, et al., "Steam-gasification of biomass in a fluidised-bed of olivine particles". Biomass and Bioenergy, 2000, vol. 19, pp. 187-197.

International Preliminary Report on Patentability for International (PCT) Application No. PCT/US05/36588, issued Apr. 9, 2008.

\* cited by examiner

ATTRITION RESISTANT FLUIDIZABLE REFORMING CATALYST

CONTRACTUAL ORIGIN

The United States Government has rights in this invention under Contract No. DE-AC3699GO10093 between the United States Department of Energy and the National Renewable Energy Laboratory, a division of the Midwest Research Institute.

BACKGROUND ART

A method of preparing a family of attrition resistant, steam reforming catalyst materials for fluid bed application is presented, and more particularly, a method of utilizing the steam reforming of the product stream from gasified biomass, and the like, to produce a hydrogen-rich product stream.

DESCRIPTION OF THE PRIOR ART

Catalytic steam reforming is not new and is typically carried out with relatively "clean" gases and vapors over a fixed bed of catalyst in a flow through reactor arrangement; however, if gases, liquids and particulate matter compose the feed stream to the catalytic reactor, the use of a packed bed system is not practical due to rapid plugging of the interstices between catalyst particles due to solids accumulation.

Commercially available reforming catalysts are designed for use in a fixed bed configuration and are offered as large particles shaped to minimize pressure drop while providing some physical strength to survive normal handling and exposure to severe reaction environments.

Fluidizable versions of these reforming catalysts are not commercially available. Nevertheless, the use of fluid bed type reactors with catalyst particles smaller in size (100 s µm range) than for fixed bed applications (mm-cm range) should address this problem.

In the past, catalyst particles for use in laboratory scale fluid bed reactors have been prepared by breaking and grinding down to size, commercial catalyst pellets, and although the resulting material exhibits reactivity while under fluidization conditions, it also readily breaks down by attrition and cannot be contained in the reactor by ordinary means. Therefore, use of such a friable material at large scale would be unrealistic both practically and economically.

U.S. Patent Application Publication No. 2003/0103893 discloses a reforming process comprising: reforming hydrocarbons in the presence of a catalyst in a reaction zone, the catalyst being Nickel (Ni) catalyst of discrete Ni crystallites formed on the support by a several step incipient wetness process, the Ni crystallites having a maximum dimension measured in any one direction in the range of between 10 and 1000 angstroms and a distribution on the support element of no more than 0.2 of a square meter of nickel exposed metal/square meter of support selected from alumina and zeolite materials, recycling the catalyst to and from the reaction zone, regenerating between 10 and 100% of the catalyst being recycled in a regeneration zone to provide a regenerated catalyst and returning the regenerated catalyst to the reaction zone.

A process for steam reforming of hydrocarbons is disclosed in U.S. Pat. No. 4,233,179, comprising: passing normally liquid hydrocarbons and steam at a ratio of about 1.5 to about 5 moles of steam per mole of carbon in the normally liquid hydrocarbons at a pressure in the range of from about 1 to 50 atmospheres and at a temperature in the range of from 800 to 1800° F. over a catalyst comprising catalytically active constituents for the reaction impregnated onto a low surface area refractory support; the improvement in which the catalytically active constituents comprise nickel, expressed as the metal, in a weight concentration of from about five to thirty percent and promotional amounts of the oxides of manganese and iron, in which the ratio of manganese to iron, expressed as the metal, does not exceed 2:1 and in which: the catalytically active constituents are not chemically bound to the refractory support, having been impregnated onto the low surface area refractory support from a solution of their heat decomposable water soluble salts, followed by calcination at a temperature of at least 700° F. but not in excess of 1200° F. for sufficient time to convert each of the salts to the oxide.

U.S. Pat. No. 5,476,877 discloses particulate solids for catalyst supports and heat transfer materials obtained in a process for production of hydrogen and carbon monoxide from a low molecular weight hydrocarbon by contact with a fluidized bed of catalyst at elevated temperatures in the presence of steam, or oxygen, or both steam and oxygen, wherein the fluidized bed is comprised of: an admixture of a particulate, fluidizable pre-calcined zirconia heat transfer solid which contains from about 0 percent to about 1 percent silica, based on the weight of the zirconia, in concentrations ranging from about 10 percent to about 99.9 percent, based on the total weight of the admixture, wherein the zirconia component of the admixture has a Davison Index measurement of not greater than about 15 and a catalyst constituted of a refractory inorganic oxide support composited with a metal, or metals, component catalytic for the production of hydrogen and carbon monoxide from low molecular weight hydrocarbons, of fluidizable particle size in concentration ranging from about 0.1 percent to about 90 percent, based on the total weight of the admixture.

Steam reforming catalyst and a method of preparing the same is disclosed in U.S. Pat. No. 5,679,614, in which the catalyst include: $Ni.Cr/MgO.La_2O_3.Al_2O_3$, the method comprising the following steps, wherein weight percentages are expressed as weight percentages per total weight of catalyst:
(a) preparing a catalyst support by mixing about 5% of lanthanum oxide, 10% of magnesium oxide and 65% aluminum oxide;
(b) calcining the resulting mixture; and
(c) adding nickel and chrome to the calcined support obtained in step (b) to complete the approximate chemical composition of the catalyst for steam reforming of hydrocarbons;
wherein the catalyst for steam reforming of hydrocarbons includes the following percentages per weight of catalyst: 15% Ni, 10% MgO, 5% Cr, 65% $Al_2O_3$, 5% $La_2O_3$; and
(d) shaping the catalyst.

A process for preparation of an improved support catalyst, containing nickel and cobalt, with or without noble metals is disclosed in U.S. Pat. No. 5,744,419. The process consists of deposition of oxides of these transition metals on a sintered low surface area porous catalyst carrier pre-coated with BeO, MgO, CaO or their mixture, useful for the oxidative conversion of methane, natural gas (which comprises mainly methane with smaller amounts of ethane, propane, butane, $CO_2$ and $N_2$ and traces of $C_5$+ hydrocarbons and water) and biogas to syngas involving partial oxidation with oxygen or oxidative steam and/or $CO_2$ reforming with oxygen of methane or light hydrocarbons.

U.S. Pat. No. 6,262,132 discloses a method of reducing Fischer-Tropsch catalyst attrition comprising: reacting a synthesis gas in a high agitation reaction system in the presence of a catalyst comprising a (gamma) γ-alumina support, wherein the γ-alumina support has an internal structure which comprises primarily γ-alumina and includes a controlled amount of a titanium dopant effective for increasing the attrition resistance of the catalyst in the high agitation reaction system.

Sudsakom et al., in "PREPARATION OF ATTRITION-RESISTANT SPRAY-DRIED FE FISCHER-TROPSCH CATALYSTS USING PRECIPITATED $SiO_2$", Ind. Eng. Chem. Res. 2001, 40, 4778-4784 disclose preparation of attrition-resistant spray-dried Fe Fischer-Tropsch catalysts using precipitated $SiO_2$.

Z. R. Ismagilov et al., in "SYNTHESIS OF MECHANICALLY STRONG AND THERMALLY STABLE SPHERICAL ALUMINA CATALYST SUPPORTS FOR THE PROCESS OF METHANE DIMERIZATION IN A FLUIDIZED BED", Catalysis Today 24 "(1995) 269-271 disclose development of a method of chemical modification for the preparation of thermally stable spherical γ-alumina catalyst supports in the size range of 1 to 3 mm in diameter for the process of methane dimerization in a fluidized bed.

Z. R. Ismagilov et al., in "NEW TECHNOLOGY FOR PRODUCTION OF SPHERICAL ALUMINA SUPPORTS FOR FLUIDIZED BED COMBUSTION" Catalysis Today 47"(1999) 51-71 disclose a technological solution for the synthesis of spherical γ-alumina (1 to 3 mm diameter) with high mechanical strength and thermal stability, in which alumina supports for catalysts operating in moving or fluidized bed reactors can be prepared via the hydrocarbon-ammonia molding of pseudo-boehmite aluminum hydroxide.

There is a need in the art of catalytic steam reforming to provide a family of attrition resistant catalyst materials for fluid bed applications, and more particularly, the steam reforming of a product stream from gasified biomass, and the like, to produce a hydrogen rich product stream that is closer to being competitive with gasoline.

The foregoing examples of the related art and limitations related therewith are intended to be illustrative and not exclusive. Other limitations of the related art will become apparent to those of skill in the art upon a reading of the specification and a study of the drawings.

SUMMARY

A family of attrition resistant catalyst materials for fluid bed application is disclosed, and more particularly, steam reforming of the liquid and gaseous product streams from gasified biomass is disclosed to produce a hydrogen rich product stream that can be used for producing fuels and chemicals. Other feedstocks successfully reformed to produce a hydrogen rich product stream with this process include vapors from gasified waste grease and plastics mixtures; volatiles from natural gas and petroleum fractions; and volatile compounds containing carbon, hydrogen, and oxygen.

A method of preparing a steam reforming catalyst is disclosed which is characterized by improved resistance to attrition when used for fluidized bed cracking, water gas shift and gasification reactions on feedstock, comprising coating a ceramic support by adding an aqueous solution of a precursor salt of a metal selected from the group consisting of Ni, Pt, Pd, Ru, Rh, Cr, Co, Mn, Mg, K, La and Fe and mixtures thereof to said ceramic support and calcining the coated ceramic in air to convert the metal salts to metal oxides.

Further disclosed is a steam reforming catalyst characterized by improved resistance to attrition loss when used for cracking, water gas shift and gasification reactions on a feedstock in a fluidized bed reactor, wherein the catalyst comprises less than 30% by weight NiO.

Still further disclosed is a steam reforming catalyst characterized by improved resistance to attrition loss when used for cracking, water gas shift and gasification reactions on feedstock in a fluidized bed reactor, wherein the catalyst comprises: less than 5 weight percent MgO; less than 10 weight percent $K_2O$; less than 1.0 weight percent Pt; a mixture containing less than 10 weight percent NiO, less than 5 weight percent MgO and less than 10 weight percent $K_2O$ and less than 1.0 weight percent Pt and less than 10 weight percent $K_2O$.

Yet further disclosed, as one basic component, is a substrate or support composed of a mixture of metal oxides, the primary component comprising α-alumina, formed into particles of small size, relatively spherical in shape, and calcined to yield a hard, porous solid; and minor components in the form of metals and/or metal oxides which may catalytically facilitate chemical reactions for production of a hydrogen rich product stream. The minor catalytic components are, in this description, incorporated throughout the support material and are an integral part of the porous solid particle.

In addition to the exemplary aspects and embodiments described above, further aspects and embodiments will become apparent by reference to the drawings and by study of the following descriptions.

BRIEF DESCRIPTION OF THE DRAWINGS AND TABLES

Exemplary embodiments are illustrated in referenced figures of the drawings. It is intended that the embodiments and figures disclosed herein are to be considered illustrative rather than limiting.

TABLE.1 Presents physical characteristics and attrition test results for a variety of commercial ball milling media, alumina supports, catalysts, and (ground and sized) commercial catalysts.

TABLE.2 Presents major physical and chemical characteristics of all materials tested for catalyst cracking and reforming activity.

TABLE.3 Presents evidence of catalytic activity of various catalyst materials tested for various types of feed streams at 850° C.

TABLE.4 Presents evidence of catalytic activity of various catalyst materials tested for tar vapor feed streams at 850° C.

FIG. 1 Is a diagram of the fluidized bed reactor system and apparatus used to evaluate the attrition resistance and/or the catalytic cracking and steam reforming activity of various catalysts and support materials.

DETAILED DESCRIPTION OF PREFERRED EMBODIMENT

Commercially available packed bed naptha reforming catalysts, crushed and sized for fluid bed operation, cannot withstand the harsh reaction conditions used in a fluidized bed for 1) reforming biomass-derived pyrolysis liquids to hydrogen, carbon dioxide and carbon monoxide; 2) cracking and reforming tars produced from biomass pyrolysis vapors to hydrogen, carbon dioxide and carbon monoxide; 3) reforming renewable feedstocks (waste grease and oils) to produce $H_2$, CO and $CO_2$; and 4) reforming hydrocarbons from natural gas and petroleum derived fractions and volatile compounds containing carbon, oxygen and hydrogen. Fluidization is required to optimize the contact of catalyst with these feedstocks, which tend to form coke instead of being cracked in a conventional fixed bed reactor arrangement.

The fluidizable catalyst particles derived from commercial catalyst pellets, which generally consist of nickel (Ni) coated onto ceramic supports, attrit significantly when fluidized and show consistent attrition rates of 10-20 wt % per day (TABLE.1). Because process economics cannot tolerate such catalyst loss, and because nickel is toxic, there was a need to identify and/or develop attrition-resistant supports and catalysts that could withstand fluidized reforming of varied feedstocks.

necessary for thermal decomposition of the natural or synthetic polymers to lower-molecular-weight volatile compounds. In the second, a 2-inch diameter reformer, 4 inch-height catalyst beds (250-300 g catalyst, particle size 350-500 µm) help crack and reform those volatile compounds to produce clean hydrogen-rich product gas. Superheated steam, air or nitrogen at a flow rate of 3-10 standard liters per minute (slm) are used as the fluidizing gas in the reactors. Steam is generated in an electrically heated boiler then superheated to

TABLE 1

| Material Identity | Description | Support Material | Shape[1] | Particle Size [mesh] | BET Surface Area [m$^2$/g] | Incipient Wetness [ml/g] | Alumina Content (nominal) [% w] | Attrition Rate [% w/48 hrs.] |
|---|---|---|---|---|---|---|---|---|
| | Potential Support Material | | | | | | | |
| A | Carbo Ceramic, HPS, mill media | n/a | s | 30/60 | 0.03 | — | ≧80 | 0.3 |
| B | CoorsTek, Std. Micro mill media | n/a | s | 30/50 | 0.02 | — | ≧90 | 0.6 |
| C | CoorsTek, Std. BG mill media | n/a | s | 30/50 | 0.07 | — | ≧90 | 11.0 |
| D | CoorsTek, Exp. 1 | n/a | s | 35/45 | 0.2-0.8 | 0.10-0.18 | 90 | 0.6 |
| E | CoorsTek, Exp. 2 | n/a | s | 40/80 | 4.9 | — | ≧90 | 39.6 |
| F | CoorsTek, Exp. 3 | n/a | s | 40/80 | 2.73 | — | ≧90 | 3.2 |
| G | CoorsTek, Exp. 4 | n/a | s | 35/50 | 0.46 | — | 90 | 5.2 |
| H | CoorsTek, Exp. 5 | n/a | s | 50/80 | 2.7 | — | ≧90 | 0.3 |
| I | CoorsTek, Exp. 6 | n/a | s | 35/50 | 1.0-1.8 | 0.10-0.18 | 99.5 | 0.5 |
| | Catalysts | | | | | | | |
| J | Süd-Chemie, C11NK catalyst | proprietary mixed oxides | g | 35/50 | 8.8-10.6 | — | 20-40 | 14.8-28.8 |
| K | ICI 46-1S catalyst | proprietary mixed oxides | g | 35/50 | n/a | — | — | 33.2 |
| Cat. 1 | Catalyst Ex. 1 | D | s | 35/50 | 1.4 | — | 90 | 0.8 |
| Cat. 2 | Catalyst Ex. 2 | I | s | 35/50 | 2.8 | — | 99.5 | 0.2 |

Attrition resistance screening experiments carried out with a variety of potential support materials showed that several ceramic materials could have the necessary strength to withstand fluidizing condition (TABLE.1). Attrition testing is performed in a laboratory scale fluidized bed reactor system.
System Description Bench-Scale Thermo-Catalytic Conversion System Acronym List
  TCD: thermal conductivity detector
  MTI: manufacturer of rapid scanning gas chromatograph
  NDIR: non-dispersive infra red analyzer
The bench-scale thermo-catalytic conversion system is shown in FIG. 1. This flexible unit can be used to investigate various thermal and catalytic processes such as pyrolysis, partial oxidation, and catalytic cracking/reforming for a variety of solid, liquid, and gaseous feedstocks. It is comprised of two Inconel, tubular, bubbling fluidized bed reactors. Each reactor is externally heated by a three-zone electric furnace and can operate at temperatures up to 900° C. In the first, a 1.5 inch-diameter reactor, a 3 inch-height silica sand bed (120 g sand of particle size 180-350 µm) is used to transfer heat 500-700° C. before entering the reactors. The flow rates of steam (2-5 g/min) are measured by orifice flow meters and controlled by pneumatic valves while electronic mass flow controllers are used for nitrogen and air. This system can also be connected to the Thermochemical Process Development Unit (TCPDU) to study catalytic processing of the slip stream gas generated in a larger-scale system.

More particularly, FIG. 1 is a schematic of the thermo-catalytic conversion system.

Solids are fed to the first reactor using a KCL24T20 K-Tron screw feeder that meters ground biomass or synthetic polymers (particle size <500 µm) to a small lock hopper built of two pneumatically controlled valves. This lock hopper is connected to a centrifugal mixing chamber and a pneumatic transfer line, which is provided with a cooling jacket in its end section to maintain temperature at the inlet to the reactor below the softening point of the plastics. The feed particles are transported at a rate of 1-2 g/inn (60-120 g/h) to the reactor by a stream of nitrogen at a flow rate of 2-3 slm. Char and sand entrained in the first reactor are captured in the cyclone and the gases and vapors formed by thermal decomposition of biomass or plastics are transferred to the second reactor through a 0.25-inch diameter heated line whose outlet is placed in the catalyst bed about 0.25 inches above the distribution plate.

The catalytic reactor is also supplied in a side port, located approximately 1 inch above the perforated distribution plate, which is used for feeding liquids or gas/vapor from TCPDU. The liquids are fed to the catalyst bed using a diaphragm pump and a spraying nozzle. TCPDU gas comes through a 0.25-inch heat-traced stainless steel line provided with a sintered metal filter, an orifice flow meter, and a gas distributing sparger. Typical gas flows in the reactor are in the range of 5-10 slm (20-40 l/min in the process conditions) resulting in 0.4-0.8 seconds residence time in the bed. Typical space velocities are 0.1-0.2 g carbon/h/g catalyst, which corresponds to the methane equivalent space velocity $G_{C_1}$VSV of 750-1500 $h^{-1}$.

Downstream of the catalytic cracker/reformer, a cyclone and a hot-gas filter capture fine catalyst particles and solids generated in the process. Those particles are recovered and weighted after every experiment. The product collection line includes two heat exchangers to condense excess steam and any remaining organic liquids. The condensate is collected in a vessel whose weight is continuously monitored. The dry gas flow rate is measured by a mass flow meter (instantaneous flow rate) and by a dry test meter (flow rate in one-minute intervals).

The concentrations of $CO_2$, CO, and $CH_4$ in the reforming gas are continuously monitored by a non-dispersive infra-red analyzer (NDIR Model 300 from California Analytical Instruments) and that of hydrogen by a thermal conductivity monitor (TCM4 from Gerhard Wagner, Germany). In addition, the gas is analyzed every 5 minutes by an on-line MTI gas chromatograph, which provides concentrations of hydrogen, carbon monoxide, carbon dioxide, methane, ethylene, and nitrogen as a function of time. In addition, the composition of the gas at the entry and at the exit of the catalytic reactor can be analyzed by molecular-beam mass spectrometer (MBMS) which is connected by heat-traced sampling lines to the respective sampling ports. The MBMS analysis allows us to quantify tar content in the gas, which is a fast way to evaluate the efficiency of the catalytic process.

All the temperatures and flows in the bench-scale unit are recorded and controlled by an OPTO data acquisition and control system. The process parameters (temperatures, flow rates, gas composition) as well as mass balance closure calculated based on NDIR analyzer data are displayed on a PC monitor.

As can be seen from FIG. 1, all experimental supports were evaluated for attrition resistance in a two inch fluidized bed reactor cooperated under simulated reforming conditions. Before attrition testing, the supports were mechanically sieved to characterize the particle size distribution and the air classified to remove very fine powders that adhere to the particles during the forming process. After air classification, the supports were evaluated for attrition resistance in the 2" fluidized bed reactor for 48 hours. Simulated reforming conditions were: 850° C., 2.5 g/min fluidizing steam and 2.5 g/min liquid water injected into the 250 g-support bed with nitrogen. Weight losses of these materials were measured after exposure to these conditions and are reported as % loss per day. The material was then recovered from the reactor and again mechanically sieved to determine the post attrition test particle size distribution.

The support materials are produced by CoorsTek Inc. to meet the required particle size, shape, surface area and attrition resistance necessary for fluidization.
The Support Requirements are as Follows:
1) Support material must be fluidizable.
   The preferred size range is approximately 100 to 1000 microns. The support material can be screened to attain the proper size range and distribution.
2) Support material must show good resistance to attrition.
   a. Spherical shape
      Spherical agglomerates can be formed by any one of a number of known forming methods, including pan mixers (pelletizers), pin mixers, fluidized bed agglomeration, immiscible liquids, etc.
   b. Wear resistance
      Wear resistance characteristics are determined by a combination of composition and grain morphology.
      i. It is well known that compositions in the range of 50 to 99.9% alumina show excellent resistance to both erosive and abrasive wear.
      ii. The catalytic support consists of spherical hard agglomerates that are composed of interconnected particles with an open, porous network. To achieve sufficient mechanical strength and wear resistance, the bonding between particles that make up an agglomerate must be uniform and consistent. This is achieved by:
         1. Use of a high and uniform green body density for the spherical agglomerates prior to sintering results in uniform particle-to-particle spacing/contact. This leads to uniform sintering (mass transport) at the particle-to-particle contacts and uniform mechanical properties.
         2. The sintering profile (time and temperature) is precisely controlled in order to control the bonding between particles and the resulting mechanical properties of the agglomerates.
3) Chemical components of the support must be compatible with the catalyst and promote catalytic reactions themselves. These components include but are not limited to:
   a. Alumina
   b. Silica
   c. Magnesia
   d. Calcia
4) Sufficient surface area and surface morphology is required to support the catalyst. The surface area of the catalytic support is preferably in the range of 0.1 to 10 $m^2/g$. This is controlled through a combination of:
   The starting particle size of the raw material used to fabricate the agglomerates. Typically the un-fired agglomerates are composed of particles with an average size in the range of 0.3 to 10 microns, preferably in the range of 0.9 to 5 microns.
   a. Uniform green body density.
   b. Controlled sintering time/temperature profile.
Preferred Composition
   The support composition is incorporated substantially through the bulk of the support material, and will consist of:
   55 to 99.5% alumina
   0.2 to 40% silica
   0.15 to 8% magnesia
   0.05 to 5% calcia by weight
   The preferred primary phase is alpha-alumina ($\alpha$-$Al_2O_3$) or mullite ($3Al_2O_3.SiO_2$)

Substrate Example

A 90% alumina composition was fabricated into a fluidizable catalytic support.

The typical minor phase composition, based on the simple oxides, of this formulation included:
- 4-8% silica
- 1.5 to 3% magnesia
- 0.5 to 2% calcia An aqueous ceramic slip was created using traditional ball milling techniques. The average particle size was between 2 and 4 microns.

Organic binders were dispersed in the ceramic slip.

The ceramic slip was spray dried.

Spherical agglomerates were created from the spray dried powder using a pan agglomeration technique. Agglomeration was achieved through the use of water.

Agglomerates were screened to between 30 and 50 mesh.

30 to 50 mesh agglomerates were sintered at 1,275° C. for 1 hour in alumina refractory.

The tap density of the resulting catalytic support was determined to be 1.54 g/cc.

The surface area of the resulting catalytic support was determined to be 0.4617 m$^2$/g by the BET method.

Support materials (D) and (I) exhibited the best combination of attrition resistance and other physical properties. Invention catalyst formulations described herein incorporate one or the other of these two types of support materials. The particle size range of interest is from 80 μm to 1000 μm ($\approx$18 to 170 mesh), preferably 150 μm to 800 μm and most preferably from 300 μm to 500 μm. Particles should be spherical in shape to minimize abrasion effects and favor stable fluidization behavior.

A first catalyst (Cat.1), prepared (Example 1) with support (D) was subjected to the attrition testing procedure to show that the catalyst preparation process had no detrimental effect on the attrition resistance of the underlying support.

Catalysts were formulated incorporating these two support materials and evaluated at several temperatures for cracking and reforming activity with a variety of feed stream compositions in the same apparatus as used for attrition testing. The reactant feed to the reactor was either 1) biomass pyrolysis or gasification derived liquids (whole or aqueous extract); or 2) liquid trap grease; or 3) biomass pyrolysis derived tar vapors.

Cracking and reforming ability on all feed types were benchmarked with the commercial C11NK catalyst, material (J). Ni-based catalysts, which may contain one to two orders of magnitude less Ni than material (J) performed similarly at 850° C. The virgin support materials (D and I) alone also exhibit some thermal cracking ability.

Feedstock Fluidized Bed Operations

For attrition testing, the reactor shown in FIG. 1 is supplied with an adequate stream of mixed gases and liquids to maintain vigorous ebullating conditions in the fluidized catalyst (or support) material at a temperature of 850° C. Flow conditions are maintained for 24 to 48 hours. The composition of the typical feed mixture for attrition testing contains 2.5 grams per minute of 10% w MeOH in water, 2.5 grams per minute of DI water as steam, 2.25 SLPM N$_2$ gas and 0.5 SLPM H$_2$ gas. The typical catalyst or support material charge for a test is $\approx$250 grams.

For catalytic activity testing, the same reactor system (FIG. 1) is used and is supplied with an appropriate amount of hydrocarbon mixture in addition to the nitrogen and steam streams. The hydrocarbon feed can be composed of one of the following biomass derived mixtures:

a) Water soluble extract of the liquid oil mixture from pyrolysis of hard and/or soft woods, with a characteristic composition of C, 10.1% w, H$_2$: 10.4% w, O$_2$: 79.5% w. The feed contains $\approx$80% w water, a steam to carbon ratio S/C of 7-9, and is supplied to the reactor at a gas hourly space velocity based on all carbon expressed as methane G$_{C_1}$HSV: 700-1000 h$^{-1}$.

b) Whole oil mixture from pyrolysis of hard and/or soft woods, with a characteristic composition of C, 36.5% w, H$_2$: 8.4% w, O$_2$: 55% w. The feed has a steam to carbon ratio S/C of 8.5, and is supplied to the reactor at a gas hourly space velocity based on all carbon expressed as methane G$_{C_1}$HSV: 1000 h$^{-1}$.

c) Water washed trap grease liquids (fatty acids and associated glycerides) from food processing with a characteristic composition of C, 76.2% w, H$_2$: 11.8% w, O$_2$: 12.6% w. This feed has a steam to carbon ratio S/C of 5, and is supplied to the reactor at a gas hourly space velocity based on all carbon expressed as methane G$_{C_1}$HSV: 1100 h$^{-1}$.

d) Tar containing vapor and gas stream derived from either the pyrolysis or gasification of woods followed by thermal cracking, with typical composition (dry, tar free gas basis) of CO$_2$: 27.7% w, CO: 13.9% w, CH$_4$: 12.1% w, C$_2$H$_4$: 2.5% w, C$_2$-C$_4$: 1.0% w, H$_2$: 33.6% w, O$_2$: 0% w, N$_2$: 7.8% w, He: 0.8% w. The tar content of the stream represents 15% w of all the carbon present. The feed has a steam to carbon ratio S/C of $\approx$7.5, and is supplied to the reactor at a gas hourly space velocity based on all carbon expressed as methane G$_{C_1}$HSV: 420-460 h$^{-1}$. The stream is supplemented with $\approx$4 SLPM of N$_2$ to fluidize the catalyst.

Catalyst Preparation and Evaluation

The two support materials of choice for attrition resistance and physical properties are materials (D) and (I) described in TABLE.1. These experimental materials are fabricated by CoorsTek Inc. of Golden, Colo. Various means of forming the particles can be utilized as practiced in the art. Formed particles are heat treated to yield the desired hardness, porosity, surface area, and density in the finished product. The metal oxide composition of the support particles can be made to include one or more components that show catalytic or stabilizing properties (TABLE.2).

TABLE 2

| Material Identity | Description | Support Material | NiO [% w] | MgO [% w] | K$_2$O [% w] | Other Metal [% w] | BET Surface Area [m2/g] | Example No. |
|---|---|---|---|---|---|---|---|---|
| J | Süd-Chemie, C11NK Catalyst | proprietary mixed oxides | 20 | 15 | 6.6 | — | 8.8-10.6 | — |
| Cat. 1 | Catalyst 1 | D | 2.4 | 3.5 | <0.02 | — | 1.4 | 1 |
| Cat. 2 | Catalyst 2 | I | 3.6 | 3.3 | <0.02 | — | 2.8 | 2 |
| Cat. 9 | Catalyst 9 | I | 0.25 | 0.08 | 0.05 | — | na | 3 |

TABLE 2-continued

| Material Identity | Description | Support Material | NiO [% w] | MgO [% w] | $K_2O$ [% w] | Other Metal [% w] | BET Surface Area [m2/g] | Example No. |
|---|---|---|---|---|---|---|---|---|
| Cat. 14 | Catalyst 14 | D | 1.1 | 2.7 | 0.39 | — | 0.88 | 4 |
| Cat. 17 | Catalyst 17 | D | 0.0 | 0.0 | 0.08 | 0.2 (Pt) | na | 5 |
| Cat. 18 | Catalyst 18 | D | 3.0 | 2.7 | 0.64 | — | 0.69 | 6 |
| Cat. 19 | Catalyst 19 | D | 1.4 | 2.1 | 0.39 | 2.5 ($La_2O_3$) | 1.03 | 7 |
| Cat. 26 | Catalyst 26 | D | 5.6 | 2.7 | 4.0 | — | 0.68 | 8 |
| D | CoorsTek Support, Exp. 1 | self | 0.0 | 1-2.5 | 0.01 | — | 0.5 | — |
| I | CoorsTek Support, Exp. 6 | self | 0.0 | 0.0 | 0.0 | — | 1.0 | — |

These support materials were used to prepare catalysts described herein. The catalytic components added to the support particles comprise mixtures of some or all of Ni—, Cr—, La—, Mg—, K—, and Pt. Resulting catalysts are evaluated for both cracking and reforming activity with one or more of the feedstocks described above. Active components were deposited onto the solid support as an aqueous solution of soluble salts by the method of incipient wetness. The wet solids are then dried and thermally treated at 650° C. to decompose the metal salt(s) into the corresponding metal oxide. Components such as MgO, $K_2O$, $La_2O_3$, remain as oxides on the surface and act as promoters or stability enhancers. Other compounds such as Cr and Ni oxides will reduce to catalytic metal species on the surface of the solid in the presence of hydrogen. Precursor salts include 99% Ni$(NO_3)_2.6H_2O$, $Cr(NO_3)_3.9H_2O$, $La(NO_3)_3.6H_2O$, and $Mg(NO_3)_2.6H_2O$ (Alfa Aesar); 99% $KNO_3$ (Aldrich); and 99.9% $H_2PtCl_6.6H_2O$ (Johnson Mathey). Other metals that can be used include Pd, Fe, Ru, Rh, Mn, Cu, and Co. In general, Mg is used to stabilize Ni crystallite size and K is used to reduce coke deposition on the catalyst surface. Nickel itself functions as both a hydrogenation and a methanation catalyst and Pt is a powerful hydrogenation catalyst. The other metals function as support modifiers (La, Mn) or as reforming catalysts (Co, Cu, Fe, Cr, Rh, Ru, Pd).

Fluidized Bed Reactor System and Apparatus

The reactor system schematic is presented in FIG. 1. The fluidized bed portion consists of a tubular two-inch-diameter Inconel reactor with a perforated gas distribution plate in the lower section and is externally heated by a three-zone electric furnace. The reactor can hold 250 g of either support or catalyst. Before tar cracking or reforming, support or catalyst in the reactor was activated in a $H_2/N_2$ stream for 2 hours. The reactor solids were then fluidized using superheated steam at 750° C. A slipstream of biomass-derived vapors was supplied to the fluidized catalyst bed through a side-mounted nozzle. Liquid feedstocks were sprayed into the fluidized bed via the same nozzle. The product collection line included a cyclone and a hot-gas filter to capture fine catalyst particles and char generated in the reactor. The system also contained two heat exchangers to condense excess steam, which was collected in a vessel whose weight was continuously monitored. The outlet gas flow rate was measured by a mass flow meter and by a dry test meter.

In both tar cracking and reforming modes, the concentrations of $CO_2$, CO, and $CH_4$ in the reforming gas were continuously monitored by a non-dispersive infrared analyzer (NDIR Model 300 from California Analytical Instruments), The concentration of hydrogen is measured by a thermal conductivity monitor (TCM4 from Gerhard Wagner, Germany). In addition, the gas was analyzed every 5 minutes by an on-line MTI gas chromatograph for hydrogen, carbon monoxide, carbon dioxide, methane, $C_{2-4}$ hydrocarbons, benzene, and nitrogen content as a function of time. System temperatures and gas flows were recorded and controlled by an OPTO data acquisition and control system. Total and elemental balances were calculated as well as the yield of hydrogen generated from the feed. In all runs, catalyst remaining in the reactor, cyclone, and filter was recovered and weighed to measure attrition loss from the reactor.

For attrition testing alone, complex hydrocarbon feed is not essential and could be replaced by a combination of methanol, water, nitrogen and hydrogen as specified earlier. An attrition test consists of quantifying the amount of particulate fines carried out of the reactor and trapped in the cyclone and filter after 48 hours of real or simulated fluidized reforming reaction. The percent weight loss (% wt) used to characterize attrition losses in TABLE.1 is the amount of catalyst fines entrained divided by the amount of catalyst originally put into the reactor×100.

Hydrocarbon Cracking and Reforming Operations

Each batch of catalyst material was evaluated at one or more temperatures between 750 to 850° C. in individual experiments that generated at least 6 hours of steady state data for cracking biomass derived vapors and/or liquids. Single or multiple run could be performed on any one batch of material. After each run in a multi run session, the catalyst bed was regenerated using a temperature ramp and air to remove carbon. Activity after regeneration was tested before the next run by checking the methane reforming activity. If methane was reformed with less than 95% efficiency, the catalyst was regenerated again until appropriate methane activity was attained. Several catalyst compositions were investigated by varying metal and metal oxide contents and proportions. Catalyst activity experiments were conducted with fresh, regenerated or partially deactivated catalyst batches. Performance data was generated for experiments lasting from 6 hours to 200 hours.

EXAMPLE 1

Catalyst (Cat.1) is prepared by sequential incipient wetness impregnation of the dry support material followed by drying and calcination of the impregnated material to decompose the metal precursor salt and form the metal oxide. Two aqueous solutions were prepared for this purpose. A Ni salt solution was prepared by combining 240.1 grams of Ni$(NO_3)_2.6H_2O$ salt with 150.09 grams of deionized water (DI).

A Mg salt solution was prepared separately by combining 104.41 grams of $Mg(NO_3)_2.6H_2O$ salt with 100.52 grams of DI water. 374.99 grams of support material (D) with a loss-on-ignition (LOI) value of 1.1% by weight was placed in a rotating drum contactor.

The first of two incipient wetness impregnations of the solid was accomplished by adding 55.07 grams of the Mg salt solution, drop wise, to the tumbling solids in the rotating drum apparatus. The moist solids were then dried and calcined, in air, in an electric muffle furnace. The temperature program consisted in ramping the temperature from room conditions to 200° C. at a rate of 25° C. per minute; dwelling at 200° C. for 90 minutes; ramping to 650° C. at a rate of 50° C. per minute; dwelling at 650° C. for 240 minutes; cutting off the power and letting the furnace and contents cool down naturally to below 100° C. prior to handling the solids. The (dry basis) weight difference between the original support and the material recovered post calcination is directly related to the amount of MgO deposited on the solid. In this case this corresponds to 1.2% by weight.

The second of the two incipient wetness impregnations of the solid was accomplished by adding 61.57 grams of the Ni salt solution, drop wise, to 362.32 grams of tumbling solids (containing 1.2% w MgO) in the rotating drum apparatus. The moist solids were then dried and calcined, in air, in an electric muffle furnace following the same temperature program described earlier. The weight difference in this step is attributed to NiO and corresponds to 2.7% w dry basis of the initial virgin support material. The virgin support is used throughout these examples as the dry basis reference for the deposited oxide concentrations.

This catalyst (Cat.1) was tested for attrition resistance and catalytic activity as reported in TABLE.1 and TABLE.3.

EXAMPLE 2

Catalyst (Cat.2) was prepared by multiple and sequential impregnations of the solids in a similar manner as (Cat.1) in example 1. The support material (I) was used in this case. Three successive additions of Mg salt solution were followed by two successive additions of Ni salt solution. Each solution addition was separated by drying and calcinations of the moist solids as described in Example 1 (five complete cycles). Based on dry basis weight differences, the final composition of (Cat.2) was approximately 3.25% w MgO and 4.12% w NiO with respect to the virgin support.

This catalyst (Cat.2) was tested for attrition resistance and catalytic activity as reported in TABLE.1 and TABLE.3.

TABLE 3

| Catalyst Identity | Reactant Feed Stream | $H_2$ Yield [%] | $CO_2/CO$ [mole ratio] | $H_2/CH_4$ [mole ratio] | Tar Cracking [%] |
|---|---|---|---|---|---|
| | Water Extracted Pyro. Oil | | | | |
| J | | 88 | 3.7 | 27.1 | NA |
| Cat. 1 | | 83 | 0.7 | 24.6 | NA |
| Cat. 2 | | 55 | 2.1 | 54.7 | NA |
| Cat. 9 | | 52 | 1.8 | 84.4 | NA |
| | Whole Pyro. Oil | | | | |
| J | | 94 | 76 | 2.5 | NA |
| Cat. 19 | | 88 | 48 | 1 | NA |
| Cat. 26 | | 91 | 59 | 1.2 | NA |

TABLE 3-continued

| Catalyst Identity | Reactant Feed Stream | $H_2$ Yield [%] | $CO_2/CO$ [mole ratio] | $H_2/CH_4$ [mole ratio] | Tar Cracking [%] |
|---|---|---|---|---|---|
| | Trap Grease | | | | |
| J | | 87 | 43 | 1.7 | NA |
| Cat. 18 | | 80 | 36 | 0.8 | NA |

| | Tar Vapors | H2/CH4 in | CO2/CO in | H2/CH4 out | CO2/CO out |
|---|---|---|---|---|---|
| J | | 1.8 | 1 | 10 | 2.6 |
| Cat. 14 | | 1.8 | 0.9 | 7 | 1.5 |
| Cat. 17 | | 1.6 | 0.8 | 4.1 | 1.4 |
| D | | 1.9 | 1 | 3.5 | 1.7 | nominal reaction temperature: 850° C.

EXAMPLE 3

Catalyst (Cat.9) was prepared using 586.45 grams of support material (I) with an LOI of 0.35% w, a surface area of 1.0 $m^2/g$, and an incipient wetness of 0.16 ml/g. All the metal salts solutions were combined into one single solution containing the required amounts of each metal. The solution volume is adjusted to the required incipient wetness volume for the mass of support material used. The (Cat.9) formulation is made with one impregnation of the solids followed by drying and calcinations.

Three stock solutions were prepared to yield a) a Ni salt solution containing the equivalent of 0.218 grams NiO per gram of solution; b) a Mg salt solution containing the equivalent of 0.082 grams of MgO per gram of solution; c) a K salt solution containing the equivalent 0.155 grams of $K_2O$ per gram of solution. All solutions were prepared from the nitrate salts. The mixed salt solution is obtained by combining 6.79 grams of the Ni solution with 5.82 grams of Mg solution, 1.97 grams of K solution, and 80.04 grams of DI water. The solution is added to the tumbling solids as in previous examples. The moist solids are then dried and calcined following the same temperature program described in Example 1. The (Cat.9) formulation represents a low concentration of catalytic metal and promoters deposited by a one step impregnation. The composition of this preparation is 0.25% w NiO, 0.08% w MgO, and 0.05% w $K_2O$. This catalyst (Cat.9) was tested for catalytic activity as reported in TABLE.3.

EXAMPLE 4

A large batch of catalyst (Cat.14) was prepared using 51000 grams of support material (D) with an LOI of 0.15% w, a surface area of 0.53 $m^2/g$, and an incipient wetness of 0.13 ml/g. Impregnation of the solids was done in one step with a salt mixture solution containing 3600.7 grams of $Ni(NO_3)_2.6H_2O$, 602.0 grams of $Mg(NO_3)_2.6H_2O$, 399.3 grams of KNO3, and 4415.95 grams of DI water. The solution was added to the tumbling solids in a cement mixer via a peristaltic pump. A 500 gram sample of moist solids was dried and calcined in the laboratory following the temperature program of example 1. Catalytic activity data is presented for this sample in TABLE.4. The balance of the moist solids was dried and calcined in a continuous rotary kiln operating at 650° C. with a retention time of approximately 2 hours.

This material represents an average composition catalyst well suited for pyrolysis oil liquids cracking and reforming.

TABLE 4

| Catalyst Identity | Reactant Feed Stream Tar Vapors | $H_2/CH_4$ in [mole ratio] | $CO_2/CO$ in [mole ratio] | $H_2/CH_4$ out [mole ratio] | $CO_2/CO$ out [mole ratio] |
|---|---|---|---|---|---|
| J |  | 1.8 | 1 | 10 | 2.6 |
| Cat. 14 |  | 1.8 | 0.9 | 7 | 1.5 |
| Cat. 17 |  | 1.6 | 0.8 | 4.1 | 1.4 |
| D |  | 1.9 | 1 | 3.5 | 1.7 | nominal reaction temperature: 850° C.

EXAMPLE 5

Catalyst (Cat.17) was prepared using 510 grams of support material (D) with an LOI of 0.15% w, a surface area of 0.53 $m^2/g$, and an incipient wetness of 0.13 ml/g. Impregnation of the solids was done in one step with a salt mixture solution containing 3.19 grams of a $H_2PtCl_6$ solution containing 30% w Pt, and 8.77 grams of a $KNO_3$ solution containing 0.046 grams $K_2O$ per gram of solution. Impregnation, drying and calcination follow the same procedure as in previous examples. The resulting composition of (Cat.17) is approximately 0.2% w Pt and 0.08% w $K_2O$. Catalytic activity of this material for tar vapor cracking and reforming is presented in TABLE.4:

EXAMPLE 6

Catalyst (Cat.18) was prepared using 501.1 grams of support material (D) with an LOI of 0.15% w, a surface area of 0.53 $m^2/g$, and an incipient wetness of 0.13 ml/g. Impregnation of the solids was done in one step with a salt mixture solution containing 83.11 grams of a Ni salt solution containing 0.218 grams of NiO per gram of solution, 24.69 grams of a K solution containing 0.155 grams $K_2O$ per gram of solution, and 12.75 grams of $Mg(NO_3)_2.6H_2O$ salt. Impregnation, drying and calcination follow the same procedure as in previous examples. The resulting composition of (Cat.18) is approximately 3.6% w NiO, 0.4% w MgO and 0.8% w $K_2O$. Catalytic activity of this material for trap grease cracking and reforming is presented in TABLE.3.

EXAMPLE 7

Catalyst (Cat.19) was prepared using 502.5 grams of support material (D) with an LOI of 0.15% w, a surface area of 0.53 $m^2/g$, and an incipient wetness of 0.13 ml/g. Impregnation of the solids was done in one step with a salt mixture solution containing 40.16 grams of a Ni salt solution containing 0.218 grams of NiO per gram of solution, 12.20 grams of a K solution containing 0.155 grams $K_2O$ per gram of solution, 42.52 grams of La solution containing 0.226 grams $La_2O_3$ per gram of solution, and 6.16 grams of $Mg(NO_3)_2.6H_2O$ salt. Impregnation, drying and calcination follow the same procedure as in previous examples. The resulting composition of (Cat.19) is approximately 1.74% w NiO, 0.2% w MgO and 0.4% w $K_2O$ and 1.9% w $La_2O_3$. Catalytic activity of this material for whole pyrolysis oil cracking and reforming is presented in TABLE.3.

EXAMPLE 8

Catalyst (Cat.26) was prepared using 501.4 grams of support material (D) with an LOI of 0.15% w, a surface area of 0.53 m2/g, and an incipient wetness of 0.13 ml/g. Impregnation of the solids was done in two consecutive steps separated by drying and calcination following the temperature program outlined in the other examples. The first impregnation was done with a mixed solution containing 69.95 grams of $Ni(NO_3)_2.6H_2O$ salt, 13.13 grams of $Mg(NO_3)_2.6H_2O$ salt, 28.36 grams of $KNO_3$, and 33.84 grams of DI water. The second impregnation used a similar solution containing 69.45 grams of $Ni(NO_3)_2.6H_2O$ salt, 13.12 grams of $Mg(NO_3)_2.6H_2O$ salt, 28.45 grams of $KNO_3$, and 33.42 grams of DI water. The resulting composition of (Cat.26) is approximately 6.9% w NiO, 0.8% w MgO and 5.3% w $K_2O$. Catalytic activity of this material for whole pyrolysis oil cracking and reforming is presented in TABLE.3.

Results and Discussion

Results for attrition resistance tests and physical properties and characteristics of potential support materials, crushed and sized commercial catalysts and invention supports and catalysts are summarized in TABLE.1.

Both commercial catalysts (J) and (K) were used for 48 hours, reforming a feed of pyrolysis oil extract and attrition losses ranged from 28-33% of the original catalyst charge. The corundum material (A) and most of the alumina samples (B, D, F, H, I) exhibited acceptable attrition resistance after 48 hours of simulated reforming. Samples (D and I) had the best combination of attrition resistance, surface area, incipient wetness volume and particle size distribution. Screen sieve analysis, performed before and after attrition tests for all materials, showed loss of material from the reactor (as recovered in the cyclone and filter) and any changes in particle size distribution. A $Ni/MgO/Al_2O_3$ catalyst (Cat.1) made with support material (D) was used for 48 hours of methanol reforming and showed a loss of <0.5% wt/day from the reactor, essentially the same loss as the support alone. This catalyst was further used for reforming pyrolysis oil for 48 hours. Attrition losses were similar to the methanol experiment (<0.5% per day). This result shows that catalyst preparation does not change support attrition resistance and that the catalyst is re-useable.

A second $Ni/MgO/Al_2O_3$ catalyst (Cat.2) made with support material (I) was prepared in a similar fashion to (Cat.1). Preparation involved multiple and sequential impregnations of the support with metal salt solutions (Examples 1 and 2). These two materials demonstrate that the attrition resistance of the catalyst is similar to that of the support alone. Furthermore, catalytic activity for both materials is also demonstrated.

The one step impregnation of the support with a mixture of metal salts in solution is introduced and demonstrated in Example 3 for the preparation of catalyst (Cat.9). A similar procedure is followed in the remaining five examples (#4-8). In Example 8 for the preparation of catalyst (Cat.26) the procedure is repeated to increase the concentration of active species. Catalytic activity for (Cat.9) material is demonstrated on aqueous pyrolysis oil extract and for (Cat.26) on whole pyrolysis oil liquids. These two materials illustrate the range in concentration of active metals and promoters of the invention.

Example 4 describes the preparation of a large batch of catalyst (Cat.14) for pilot scale testing. Its catalytic activity for tar vapor reforming is presented in TABLE.4.

Example 5 describes a formulation (Cat.17) containing Pt as the active species. Other metals that can provide cracking activity include Co, Cr, Cu, Fe, Pd, Rh, and Ru. This Pt containing material was also tested with tar vapors.

Example 6 describes a catalyst (Cat.18) similar to Cat.14 with a three-fold increase in active Ni. This material was tested on a trap grease feed.

Example 7 describes a formulation (Cat.19) incorporating some lanthanum oxide in addition to the Ni, Mg and K oxides. This material was tested on whole pyrolysis oil.

The various examples cover variations in support materials, impregnation types, composition and concentration in metals and metal oxides deposited onto the solid or incorporated within, and catalytic activity with various biomass derived feed types. Catalyst compositions are summarized in TABLE.2. Catalysts performance for cracking and reforming biomass derived vapors and liquids, tars and waste trap grease are summarized in TABLE.3 and TABLE.4. Performance parameters (hydrogen formed, and/or critical product gas ratios) are presented in support of catalytic activity at 850° C. for the various materials tested. All concentrations are representative of steady state conditions. The $H_2/CH_4$ ratio measures catalyst reforming activity and selectivity for hydrogen production and $CO_2/CO$ indicates water gas shift activity. The tar cracking efficiency is reported as the change in gas ratios between inlet and outlet. Hydrogen yield is the factor increase in outlet to inlet hydrogen concentration.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

What is claimed is:

1. A method of preparing a steam reforming catalyst characterized by improved resistance to attrition when used for fluidized bed cracking, water gas shift and gasification reactions on feedstock, said catalyst comprising:
   a) less than 10% by weight NiO,
   b) less than 5% by weight MgO,
   c) less than 10% by weight $K_2O$, and
   d) a support material comprising at least 90% alpha-alumina;
   wherein the support material has a surface area of from 0.1 to 10 $m^2/g$, and wherein the catalyst exhibits cracking and reforming activity on biomass derived vapors for at least six hours at 850° C. in a fluidized bed reactor;
   said method comprising coating the support material by adding an aqueous solution of precursor salts of Ni, Mg and K to the support material and calcining the coated support material in air to convert the metal salts to metal oxides.

2. The method of claim 1 wherein the aqueous solution further comprises a precursor salt of a metal selected from the group consisting of Pt, Pd, Cu, Ru, Rh, Cr, Co, Mn, La, Fe, and mixtures thereof.

3. The method of claim 1 wherein the aqueous solution of precursor salts comprises $Ni(NO_3)_2.6H_2O$.

4. The method of claim 1 wherein the aqueous solution further comprises a precursor salt of Pt.

5. The method of claim 4 wherein the precursor salt is $H_2PtCl_6.6H_2O$.

6. The method of claim 1 wherein the aqueous solution further comprises a precursor salt of Ru.

7. The method of claim 1 wherein the aqueous solution of precursor salts comprises Mg $(NO_3)_2.6 H_2O$.

8. The method of claim 1 wherein the aqueous solution of precursor salts comprises a mixture of Ni, Ru, Mg and K.

9. The method of claim 1 wherein the aqueous solution of precursor salts comprises $KNO_3$.

10. The method of claim 1 wherein the aqueous solution of precursor salts comprises a mixture of Ni, Pt, Mg and K.

11. The method of claim 10 wherein the aqueous solution of precursor salts comprises a mixture of $Ni(NO_3)_2.6H_2O$, $H_2PtCl_6.6 H_2O$, Mg $(NO_3)_2.6H_2O$ and $KNO_3$.

12. A steam reforming catalyst having improved resistance to attrition loss when used for cracking, water gas shift and gasification reactions on feedstock in a fluidized bed reactor, said catalyst comprising:
   a) less than 10% by weight NiO,
   b) less than 5% by weight MgO,
   c) less than 10% by weight $K_2O$, and
   d) a support material comprising at least 90% alpha-alumina;
   wherein the support material has a surface area of from 0.1 to 10 $m^2/g$, and wherein the catalyst exhibits cracking and reforming activity on biomass derived vapors for at least six hours at 850° C. in a fluidized bed reactor.

13. The steam reforming catalyst of claim 12, wherein the catalyst exhibits less than 0.5 wt % attrition loss per day in a fluidized bed reactor at 850° C.

14. The steam reforming catalyst of claim 13, wherein the catalyst further comprises a metal selected from the group consisting of platinum, palladium, iron, ruthenium, rhodium, manganese, copper, cobalt, chromium, lanthanum, a salt of these metals, and mixtures thereof.

15. The steam reforming catalyst of claim 13, wherein the catalyst further comprises ruthenium or a salt thereof.

16. The steam reforming catalyst of claim 12, wherein the catalyst further comprises a metal selected from the group consisting of platinum, palladium, iron, ruthenium, rhodium, manganese, copper, cobalt, chromium, lanthanum, a salt of these metals, and mixtures thereof.

17. The steam reforming catalyst of claim 12, wherein the catalyst further comprises ruthenium or a salt thereof.

18. The steam reforming catalyst of claim 12, wherein the support material further comprises silica, magnesia or calcia.

19. The steam reforming catalyst of claim 12, wherein the support material is spherical.

20. The steam reforming catalyst of claim 12, wherein the size of the support material ranges from 80 μm to 1000 μm.

21. The steam reforming catalyst of claim 12, wherein the size of the support material ranges from 150 μm to 800 μm.

22. The steam reforming catalyst of claim 12, wherein the size of the support material ranges from 300 μm to 500 μm.

23. A steam reforming catalyst having improved resistance to attrition loss when used for cracking, water gas shift and gasification reactions on feedstock in a fluidized bed reactor, said catalyst comprising:
   a) less than 10% by weight NiO,
   b) less than 5% by weight MgO,
   c) less than 10% by weight $K_2O$, and
   d) a support material comprising at least 90% alpha-alumina;

wherein the size of the support material ranges from 80 μm to 1000 μm, and wherein the catalyst exhibits cracking and reforming activity on biomass derived vapors for at least six hours at 850° C. in a fluidized bed reactor.

24. The steam reforming catalyst of claim 23, wherein the catalyst exhibits less than 0.5 wt % attrition loss per day in a fluidized bed reactor at 850° C.

25. The steam reforming catalyst of claim 24, wherein the catalyst further comprises ruthenium or a salt thereof.

26. The steam reforming catalyst of claim 23, wherein the catalyst further comprises a metal selected from the group consisting of platinum, palladium, iron, ruthenium, rhodium, manganese, copper, cobalt, chromium, lanthanum, a salt of these metals, and mixtures thereof.

27. The steam reforming catalyst of claim 23, wherein the catalyst further comprises ruthenium or a salt thereof.

28. The steam reforming catalyst of claim 23, wherein the support material further comprises silica, magnesia or calcia.

29. The steam reforming catalyst of claim 23, wherein the support material is spherical.

30. The steam reforming catalyst of claim 23, wherein the support material has a surface area of from 0.1 to 10 $m^2/g$.

* * * * *